(12) United States Patent
DeCuzzi (10) Patent No.: US 12,059,959 B2
(45) Date of Patent: Aug. 13, 2024

(54) DRIVE SYSTEM FOR ALL-TERRAIN VEHICLE (ATV)

(71) Applicant: Louis DeCuzzi, Brunswick, OH (US)

(72) Inventor: Louis DeCuzzi, Brunswick, OH (US)

(73) Assignee: Louis DeCuzzi, Brunswick, OH (US)

( * ) Notice: Subject to any disclaimer, the term of this patent is extended or adjusted under 35 U.S.C. 154(b) by 0 days.

(21) Appl. No.: 18/467,311

(22) Filed: Sep. 14, 2023

(65) Prior Publication Data

US 2024/0001756 A1    Jan. 4, 2024

Related U.S. Application Data

(63) Continuation of application No. 17/084,760, filed on Oct. 30, 2020, now Pat. No. 11,766,929.

(Continued)

(51) Int. Cl.

| | | |
|---|---|---|
| B60K 7/00 | (2006.01) | |
| B60K 1/04 | (2019.01) | |
| B60K 17/04 | (2006.01) | |
| B60K 17/12 | (2006.01) | |
| B60K 17/22 | (2006.01) | |
| B60L 15/20 | (2006.01) | |
| B60L 50/60 | (2019.01) | |
| B60L 53/22 | (2019.01) | |
| B60Q 1/04 | (2006.01) | |
| B60Q 1/20 | (2006.01) | |
| B60Q 1/30 | (2006.01) | |
| B60Q 1/34 | (2006.01) | |
| B60Q 1/44 | (2006.01) | |

(Continued)

(52) U.S. Cl.
CPC .............. *B60K 7/0007* (2013.01); *B60K 1/04* (2013.01); *B60K 17/043* (2013.01); *B60K 17/12* (2013.01); *B60K 17/22* (2013.01); *B60L 15/20* (2013.01); *B60L 50/66* (2019.02); *B60L 53/22* (2019.02); *B60Q 1/04* (2013.01); *B60Q 1/20* (2013.01); *B60Q 1/30* (2013.01); *B60Q 1/34* (2013.01); *B60Q 1/44* (2013.01); *B60Q 5/00* (2013.01); *B62D 21/183* (2013.01); *B62D 61/065* (2013.01); *H02K 7/006* (2013.01); *H02K 7/116* (2013.01); *H02K 11/0094* (2013.01); *B60K 2001/0405* (2013.01); *B60K 2007/0038* (2013.01); *B60L 2210/12* (2013.01); *B66D 1/12* (2013.01)

(58) Field of Classification Search
CPC ........ B60K 7/0007; B60K 1/04; B60K 17/12; B60K 17/22; B60K 2001/0405; B60L 15/20

See application file for complete search history.

(56) References Cited

U.S. PATENT DOCUMENTS

| | | | | |
|---|---|---|---|---|
| 3,930,552 A | * | 1/1976 | Kunkle | ............... H01M 50/204 180/68.5 |
| 4,216,839 A | * | 8/1980 | Gould | ..................... B60L 50/66 267/221 |

(Continued)

*Primary Examiner* — Frank B Vanaman
(74) *Attorney, Agent, or Firm* — Sisson & Banyas, Attorneys at Law, LLC; Jeffrey J. Banyas (57) ABSTRACT

A drive system for an all-terrain vehicle (ATV). The drive system may comprise an electric motor, at least three wheel and tire assemblies, a primary battery, a control module and a throttle device. The primary batter may be located within at least two opposing frame rails of a chassis of the all-terrain vehicle.

15 Claims, 5 Drawing Sheets

Related U.S. Application Data (60) Provisional application No. 62/927,987, filed on Oct. 30, 2019.

(51) Int. Cl.
  *B60Q 5/00* (2006.01)
  *B62D 21/18* (2006.01)
  *B62D 61/06* (2006.01)
  *H02K 7/00* (2006.01)
  *H02K 7/116* (2006.01)
  *H02K 11/00* (2016.01)
  *B66D 1/12* (2006.01)

(56) References Cited

U.S. PATENT DOCUMENTS

| | | | | |
|---|---|---|---|---|
| 5,585,205 A * | 12/1996 | Kohchi | ............... | H01M 50/209 |
| | | | | 180/68.5 |
| 5,760,569 A * | 6/1998 | Chase, Jr. | ........... | H01M 50/204 |
| | | | | 414/281 |
| 6,047,786 A * | 4/2000 | Stevenson | ............... | B60L 50/66 |
| | | | | 180/68.5 |
| 6,144,125 A * | 11/2000 | Birkestrand | ............. | B62M 7/12 |
| | | | | 310/68 B |
| 2002/0066606 A1* | 6/2002 | Nakamori | ................ | B62M 7/00 |
| | | | | 180/65.1 |
| 2010/0108416 A1* | 5/2010 | Lind | ........................ | B60L 50/66 |
| | | | | 701/22 |
| 2010/0133030 A1* | 6/2010 | Johnson | ................... | B62M 6/90 |
| | | | | 180/68.5 |
| 2010/0314182 A1* | 12/2010 | Crain | ...................... | B60L 50/66 |
| | | | | 320/109 |
| 2010/0320012 A1* | 12/2010 | Stappen | .................. | B60L 53/80 |
| | | | | 180/65.1 |
| 2011/0162896 A1* | 7/2011 | Gillett | ..................... | B60K 35/10 |
| | | | | 180/2.2 |
| 2013/0264134 A1* | 10/2013 | Matsuda | .................. | B62M 7/04 |
| | | | | 180/68.1 |
| 2014/0144719 A1* | 5/2014 | Morgan | .................. | B60T 1/062 |
| | | | | 180/65.31 |
| 2017/0106733 A1* | 4/2017 | Tsuji | ......................... | B60R 5/04 |
| 2017/0334279 A1* | 11/2017 | Higuchi | ................. | B60L 50/66 |
| 2018/0130983 A1* | 5/2018 | Tessier | ................ | H01M 50/202 |

* cited by examiner

DRIVE SYSTEM FOR ALL-TERRAIN VEHICLE (ATV)

CROSS REFERENCES AND PRIORITIES

This application claims priority from U.S. application Ser. No. 17/084,760 filed on 30 Oct. 2020 and U.S. Provisional Application No. 62/927,987 filed on 30 Oct. 2019, the teachings of each of which are incorporated by reference herein in their entirety.

BACKGROUND

All-terrain vehicles, also known as ATVs, are used for a variety of purposes including personal recreation, safety patrols, search and rescue operations, and racing. ATVs come in many configurations including three wheel and four wheel variations. The typical ATV has a space frame chassis with an internal combustion engine mounted within the space frame to provide rotational force to the ATV's drive train which in turn rotates at least one of the ATV's wheel and tire assemblies.

Recently, efforts have been made to replace the internal combustion engines in many types of vehicles—such as cars and trucks—with an electric motor. These efforts have also been directed to ATVs.

One challenge faced when replacing internal combustion engines with electric motors centers around the use of batteries. Electric motors used in portable vehicles cannot be hard wired to an electrical grid due to the mobile nature of the vehicle. Accordingly, the vehicle must include a battery for providing electricity to the electric motor. Electric vehicle batteries must be of a relatively high voltage to provide sufficient electricity to the electric motor to allow the vehicle to travel a reasonable distance without having to recharge or replace the battery. This often results in batteries for electric vehicles having a large volume and weight, which is often incongruous with relatively small vehicles such as ATVs.

Early efforts to convert ATVs from internal combustion engines to electric motors have addressed this problem by mounting the battery outside of the space frame chassis. The typical mounting location is high above the rear axle. Given the relatively high weight of the battery, this can have significant negative ramifications for the ATVs handling characteristics and safety. The battery weight mounted at this location can give the ATV an unwanted high center of gravity, and provide a poor front to rear weight balance.

The need exists—therefore—for an improved drive system for an ATV which makes use of an electric motor powered by a battery.

SUMMARY

Disclosed herein is a drive system for an all-terrain vehicle (ATV). The drive system comprises an electric motor, at least three wheel and tire assemblies, a primary battery, a control module, and a throttle device. The primary battery is located within at least two opposing frame rails of a chassis of the all-terrain vehicle (ATV).

The electric motor may be a three-phase electric motor. The electric motor may be rotationally connected to at least one of the wheel and tire assemblies. The electric motor may be electrically connected to, and configured to receive at least a first signal from the control module. The control module may be electrically connected to, and configured to receive a charge from the primary battery. The throttle device may be electrically connected to, and configured to send a second signal to the control module.

In some embodiments, the electric motor may be rotationally connected to at least two of the wheel and tire assemblies. In certain embodiments, the drive system may comprise four wheel and tire assemblies. The electric motor may be rotationally connected to each of the four wheel and tire assemblies. In certain embodiments, the electric motor may be rotationally connected to the wheel and tire assemblies by an electric motor gearbox which is rotationally connected to a driveshaft which is rotationally connected to a gearbox which is rotationally connected to an axle.

In some embodiments, the drive system may further comprise at least one device selected from the group consisting of a light, a horn, and a winch. The drive system may also further comprise a step down converter, a secondary battery, and a transducer. The step down converter, when present, may be electrically connected to, and configured to receive a charge for the second battery at a first voltage level. Each device of the at least one device may be electrically connected to, and configured to receive a signal from the step down converter at a second voltage level which is less than the first voltage level when a circuit between the device and the secondary battery is opened. The transducer may be electrically connected to the primary battery and the secondary battery to provide a recharging voltage to the secondary battery from the primary battery.

The at least one device, in certain embodiments, may comprise at least one light. The at least one light may be selected from the group consisting of at least one headlight, at least one tail light, at least one brake light, at least one turn signal light, at least one daytime running light, and at least one fog light.

In certain embodiments, the primary battery may be contained within a housing. The housing, when present, may have a first cuboid shape. In some such embodiments, the housing may include an extension protruding upward from a top surface of the first cuboid shape. The extension itself may have a second cuboid shape.

In some embodiments, the chassis may comprise a slideable drawer configured to receive the primary battery. In certain such embodiments, the slideable drawer may comprise a pair of opposing tracks. In some such embodiments, at least one of the pair of opposing tracks may comprise a friction reducing mechanism. The friction reducing mechanism may be at least one bearing. In some embodiments, the friction reducing mechanism may be at least one slide plate. The at least one slide plate, when present, may comprise a material selected from the group consisting of ultra high molecular weight polyethylene (UHMW) plastics, bronze, powdered metal, and Teflon®.

In certain embodiments the electric motor may be rotationally connected to the wheel and tire assemblies by a gear and chain drive connected to an axle. In other embodiments, the electric motor may be rotationally connected to the wheel and tire assemblies by a belt and pulley drive connected to an axle.

In some embodiments the primary battery may be a lithium battery. In other embodiments the primary battery may be a lead acid battery.

DETAILED DESCRIPTION

Disclosed herein is a drive system for an all-terrain vehicle. The drive system is described below with reference to the Figures. As described herein and in the claims, the following numbers refer to the following structures as noted in the Figures.

10 refers to a drive system.
20 refers to an all-terrain vehicle.
30 refers to a chassis.
35 refers to a slideable drawer.
37 refers to a track.
100 refers to an electric motor.
110 refers to an electric motor gearbox.
200 refers to a wheel and tire assembly.
210 refers to a gearbox.
220 refers to an axle.
230 refers to a driveshaft.
300 refers to a primary battery.
310 refers to a stepdown converter.
350 refers to a secondary battery.
355 refers to a transducer.
400 refers to a control module.
500 refers to a throttle device.
600 refers to a light.
610 refers to a horn.
620 refers to a winch.

Figure 1:
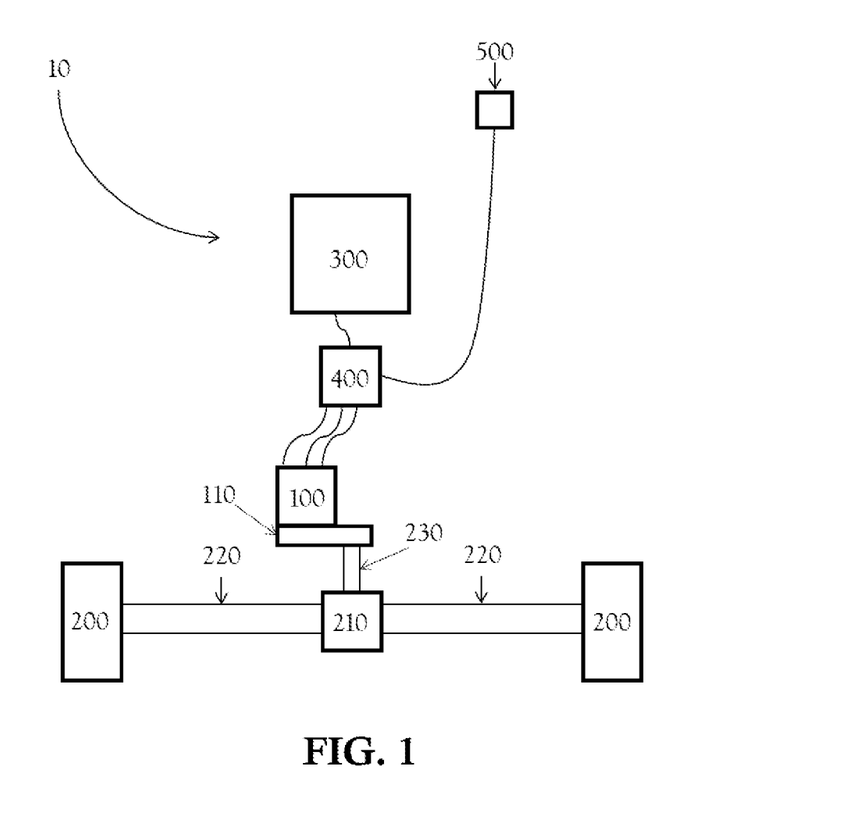
FIG. 1 is a block diagram of an embodiment of a drive system for an all-terrain vehicle (ATV).
Figure 4:
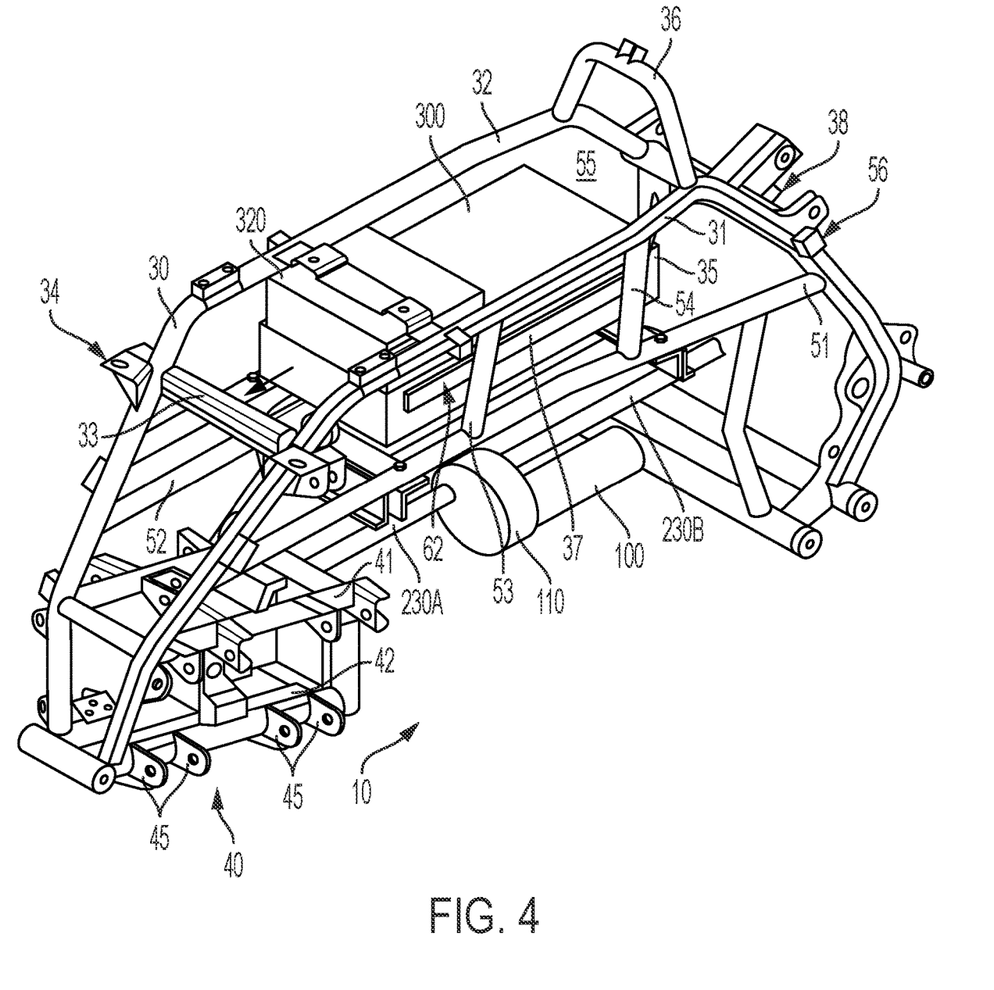
FIG. 4 is a perspective view of a chassis of an all-terrain vehicle with a battery installed therein.

FIG. 1 depicts a block diagram of one embodiment of a drive system (10) for an all-terrain vehicle (ATV) (20 as shown in FIG. 4). As depicted in FIG. 1, the drive system may comprise an electric motor, at least three wheel and tire assemblies (200) (only two of which are shown in FIG. 1), a primary battery (300), a control module (400), and a throttle device (500). While FIG. 1 shows only two wheel and tire assemblies—many configurations of wheel and tire assemblies are possible, non-limiting examples of which are described below.

FIG. 1 also depicts the connections between the various components. As shown in FIG. 1, the electric motor (100) may be rotationally connected to at least one of the wheel and tire assemblies (200). The rotational connection may come in a variety of configurations.

In some embodiments, the ATV may be a three wheeled ATV with two wheel and tire assemblies in the front and a single wheel and tire assembly in the back. In such embodiments, the electric motor may be rotationally connected to the single wheel and tire assembly in the back by a gear and chain drive connected to an axle or by a belt and pulley drive connected to an axle.

In other embodiments, the ATV may be a three wheeled ATV with one wheel and tire assembly in the front and two wheel and tire assemblies in the back. In such embodiments, the electric motor may be rotationally connected to the two wheel and tire assemblies in the back by any number of mechanisms. One preferred mechanism—as shown in FIG. 1—is an electric motor gearbox (110) which is rotationally connected to a driveshaft (230) which is rotationally connected to a gearbox (210) which is rotationally connected to an axle (220). Examples of other mechanisms include a gear and chain drive connected to an axle, or a belt and pulley drive connected to an axle.

Four wheeled embodiments of ATVs are common with two wheel and tire assemblies in the front and two wheel and tire assemblies in the back. In such embodiments, the electric motor may be rotationally connected to the two wheel and tire assemblies in the back, the two wheel and tire assemblies in the front, or each of the four wheel and tire assemblies. Mechanisms for connecting the electric motor to the wheel and tire assemblies may include an electric motor gearbox which is rotationally connected to a driveshaft which is rotationally connected to a gearbox which is rotationally connected to an axle, a gear and chain drive connected to an axle, or a belt and pulley drive connected to an axle. In embodiments where the electric motor is rotationally connected to each of the four wheel and tire assemblies—there may be two mechanisms—one for connecting the electric motor to the two wheel and tire assemblies in the front and a second for connecting the electric motor to the two wheel and tire assemblies in the back, although the mechanism connecting the electric motor to the two wheel and tire assemblies in the front may share an electric motor gearbox with the mechanism connecting the electric motor to the two wheel and tire assemblies in the back.

FIG. 1 also shows the electric motor (100) electrically connected to, and configured to receive at least a first signal from the control module (400). The preferred electric motor is a three-phase electric motor. The electrical connection between the electric motor and the control module may comprise three separate electrical communication connections. Each electrical communication sends a signal in the form of amperage from the control module to the electric motor to activate one of the coils of the electric motor.

The control module (400) may be electrically connected to, and configured to receive a charge from the primary battery (300) as shown in FIG. 1. The charge from the primary battery will be in the form of voltage which is passed through the control module and transmitted to another device—such as the electric motor (100)—when the control module receives a signal to activate said other device—such as a signal from a throttle device (500).

FIG. 1 further depicts the throttle device (500) electrically connected to, and configured to send a second signal to the control module (400). The second signal indicates to the control module to pass voltage from the primary battery (300) to the electric motor (100) with the amount of voltage controlled by the amount of throttle input provided by the operator. Specific non-limiting examples of a throttle device include a pedal throttle, a thumb throttle, and a twist throttle—each of which are well known in the art.

The primary battery (300), is preferably a 72 volt 100 amp lithium battery. The lithium battery may be a lithium ion battery, a lithium polymer battery, or a lithium prismatic battery. While a lithium battery is preferred, other batteries are possible, including lead acid batteries.

The control module (400) draws amperage from the primary battery upon receiving a signal from the throttle device. The control module then passes said amperage to the electric motor. Preferably the amount of amperage transmitted to the electric motor is determined by the amount of user input into the throttle device. The preferred control module is a circuit board.

Figure 2:
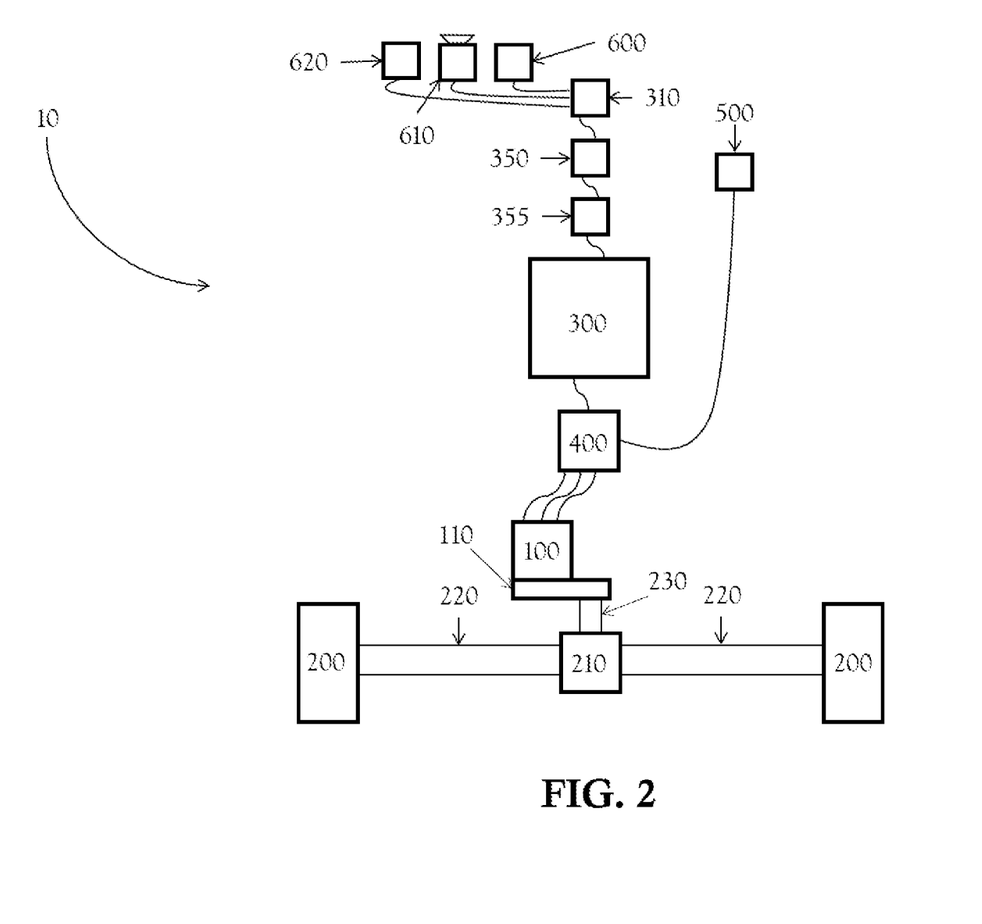
FIG. 2 is a block diagram of a separate embodiment of a drive system for an all-terrain vehicle (ATV).

FIG. 2 depicts an embodiment of the drive system (10) showing additional features of the all-terrain vehicle (ATV). As shown in FIG. 2, the drive system may further comprise at least one device selected from the group consisting of a light (600), a horn (61), and a winch (620). The drive system may also further comprise a step down converter (310), a secondary battery (350), and a transducer (355).

As shown in FIG. 2, the step down converter (310) may be electrically connected to, and configured to receive a charge from the secondary battery (350) at a first voltage level. The step down converter then reduces the charge before sending the charge at a second voltage level (which is less than the first voltage level) to each device of the at least one device. In this regard, it is noted that each device of the at least one device may be electrically connected to, and configured to receive a charge from the step down converter.

The transducer (355) may be electrically connected to the primary battery (300) and the secondary battery (350) as shown in FIG. 2. This allows the secondary battery to be recharged by the primary battery through the transducer. In other words, the transducer provides a recharging voltage to the secondary battery from the primary battery.

Each device of the at least one device may be electrically connected to, and configured to receive a signal from the secondary battery (350) through the step down converter (310). This signal may be in the form of voltage from the secondary battery when a circuit between the secondary battery is opened, such as by a switch or button.

When the at least one device includes a light (600), the light may be in a variety of locations and may serve a variety of well-known functions. Common lights include at least one headlight, at least one tail light, at least one brake light, at least one turn signal light, at least one daytime running light, and at least one fog light.

Figure 3:
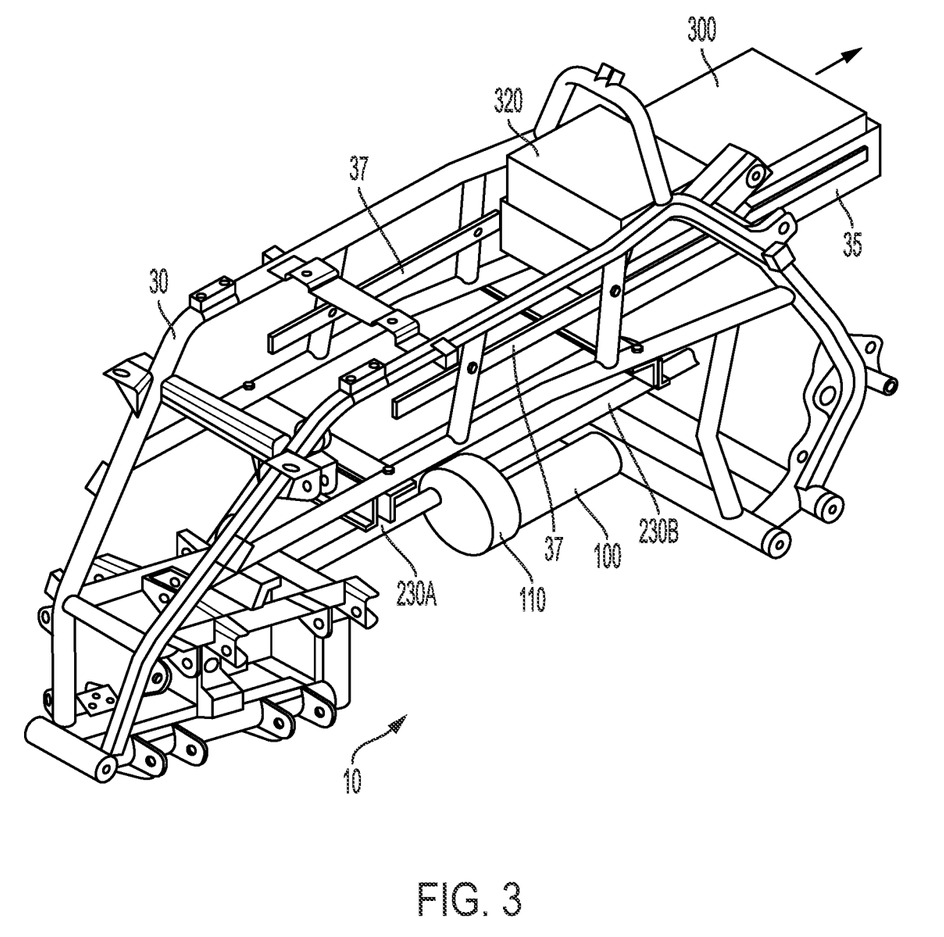
FIG. 3 is a perspective view of a chassis of an all-terrain vehicle with a battery in place for installation.

FIG. 3 depicts one embodiment of the primary battery (300) and chassis (30) of the all-terrain vehicle. As shown in FIG. 3, the primary battery may be contained within a housing (320). The housing may have a cuboid shape as shown in FIG. 3, although other shapes may be possible including a cube, a cylinder, a sphere, a spheroid, or any polyhedron having four or more faces.

In some embodiments, such as that shown in FIG. 3, the housing (320) may include at least one extension. When present, at least one of the extensions may protrude upward from a top surface of the cuboid shape of the housing. In certain embodiments, the extension itself may also have a cuboid shape, although other shapes may be possible including a cube, a cylinder, a sphere, a spheroid, or any polyhedron having four or more faces.

FIG. 3 also shows a removal system for the primary battery (300). The removal system may comprise a slideable drawer (35) configured to receive the primary battery. The slideable drawer may be connected to the chassis (30) within at least two opposing frame rails of the chassis. As shown in FIG. 3, the slideable drawer may comprise a pair of opposing tracks (37) similar to those used in toolbox or kitchen drawers.

In some embodiments, the pair of opposing tracks (37) may comprise a friction reducing mechanism. One example of a friction reducing mechanism is a bearing, which may be a ball bearing, or a roller bearing. Another example of a friction reducing mechanism is a slide plate. Slide plates may be comprised of a material selected from the group consisting of ultra high molecular weight polyethylene (UHMW) plastics, bronze, powdered metal, and Teflon®.

As shown in FIG. 3, the slideable drawer (35) has been extended at least partially out the rear of the all-terrain vehicle's chassis. While FIG. 3 shows the slideable drawer extending out the rear of the all-terrain vehicle's chassis, other configurations may exist in which the slideable drawer is configured to extend out the front of the all-terrain vehicle's chassis, or out of either side of the all-terrain vehicle's chassis. Once the slideable drawer has been extended, the primary battery (300) can be easily unplugged from the all-terrain vehicle's electrical system and removed from all-terrain vehicle for repair, replacement, or storage during times of non-use of the all-terrain vehicle.

FIG. 3 also shows the electric motor (100) located within at least two opposing frame rails of the chassis. The embodiment of the electric motor shown in FIG. 3 is configured for a four-wheel drive all-terrain vehicle in which the electric motor is rotationally connected to the two wheel and tire assemblies in the back of the all-terrain vehicle as well as the two wheel and tire assemblies in the front of the all-terrain vehicle. In the embodiment shown in FIG. 3, the electric motor is rotationally connected to the wheel and tire assemblies by an electric motor gearbox (110) which is rotationally connected to a pair of driveshafts (230A/230B) with the front driveshaft configured to be rotationally connected to a first gearbox which is rotationally connected to an axle which turns the wheel and tire assemblies in the front of the all-terrain vehicle, and the rear driveshaft configured to be rotationally connected to a second gearbox which is rotationally connected to an axle which turns the wheel and tire assemblies in the back of the all-terrain vehicle.

FIG. 4 depicts a perspective view of a chassis (30) of an all-terrain vehicle (ATV). As shown in FIG. 3, the primary battery (300) may be located within at least two opposing frame rails of the chassis. In the embodiment shown in FIG. 3, the primary battery is located within a housing which is configured to fit within the slideable drawer (35). Unlike in FIG. 3 where the slideable drawer is shown extended to allow the battery to be removed, in FIG. 4 the slideable drawer is retracted showing the battery in place where it resides during operation of the ATV. In some embodiments, once the slideable drawer is retracted, one or more latches or lock assemblies may hold the slideable drawer in place to prevent the slideable drawer from extending during operation.

As shown in FIG. 4, during operation the primary battery (300) may be located within at least two opposing frame rails of the chassis (30). While FIG. 4 shows the primary battery located within at least two opposing frame rails of the chassis in the approximate location of a fuel tank found in a traditional internal combustion engine powered ATV, other locations may be possible. For example, in some embodiments, the primary battery may be located in the approximate location of the engine found in a traditional internal combustion powered ATV.

Figure 5:
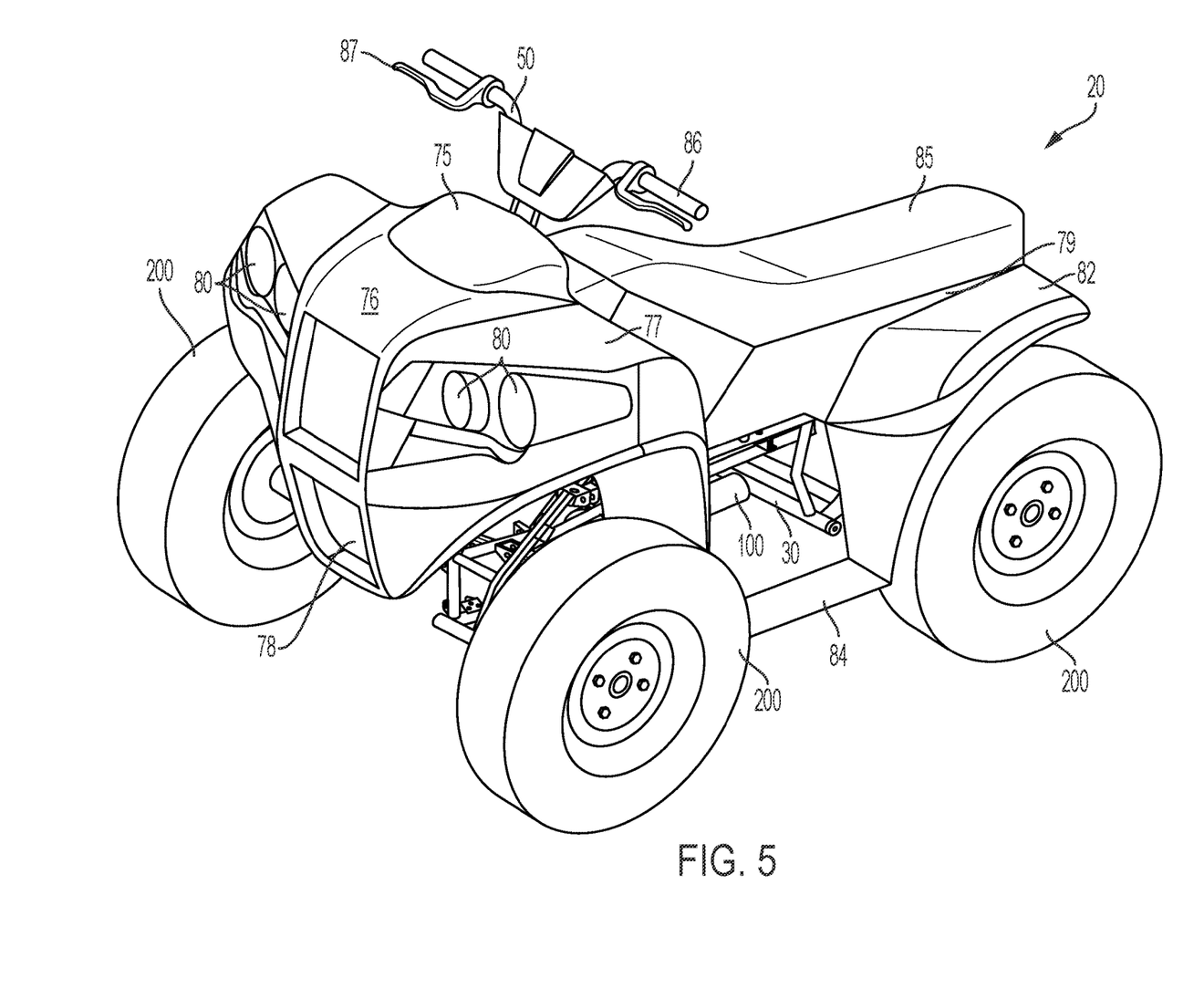
FIG. 5 is a perspective view of an all-terrain vehicle having a drive system as described herein.

FIG. 5 depicts a perspective view of an all-terrain vehicle (20) including the drive system (10) disclosed herein. As shown in FIG. 4, the primary battery (300) may be located within at least two opposing frame rails of the chassis. In this case—and in FIG. 3—the chassis is a space frame chassis as found in most ATVs. However, other embodiments may exist in which the chassis is a ladder frame chassis, a unibody chassis, a backbone tube chassis, an X-frame chassis, a perimeter frame chassis, a platform frame chassis, or a subframe chassis.

With reference to FIG. 4, chassis (30) of an all-terrain vehicle (ATV) includes a first frame rail (31) and a second frame rail (32) spaced from each other by generally horizontally extending struts (33). Each frame rail (31,32) traces a somewhat arcuate shape extending upward from a forward end (34) of chassis to a saddle portion (36) and then downward rearward of the saddle portion to the rear end (38) of chassis (30). As shown, first and second frame rails (31,32) extend laterally outward from each other as they extend from forward end (34) toward saddle portion (36). First and second rails (31,32) run generally parallel to each other at saddle portion (36). The lateral spacing of first and second rails (31,32) at saddle portion is sufficiently narrow to allow a rider to straddle the saddle portion (36) riding with legs extending downward on either side of chassis (30). Rearward of saddle portion (36), first and second frame rails (31, 32) spread laterally apart relative to each other at rear end (38) of chassis (30).

At the forward end (34) of chassis (30), a suspension subframe generally indicated at (40) may be formed by upper and lower horizontally extending members (41,42) extending inward from frame rails (31,32). Each of the upper and lower members (41,42) of the suspension subframe (40) include plural tabs (45) to which suspension links are attached. As best shown in FIG. 5, a pair of wheel and tire assemblies may be suspended from the front end (34) of chassis (30). A handle bar, generally indicated at (50) is coupled to the front wheel and tire assemblies to provide steering inputs to the front wheels.

First and second cross supports (51,52) extend from the front end (34) of chassis (30) to rear end (38) of chassis (30). As shown, the cross supports (51,52) may extend rearward from front end (34) above suspension subframe (40) yet below saddle portion (36) of frame rails (31,32) to help support the arc formed by the frame rails (31,32) and stiffen chassis (30). In the example, the cross supports (51,52) extend rearward from front end (34) of chassis (30) generally parallel to each other along at least a portion of the saddle portion (36). In the example, cross supports (51,52) extend parallel to each other until reaching the center of saddle portion (36). From the center of saddle portion (36), the cross supports (51,52) extend laterally outward relative to each other until they intersect with the rear end (38) of chassis (30). As seen in FIG. 4, the lateral outward extension of the cross supports (51,52) causes the supports to pass under the saddle portion (36) of frame rails (31,32) at a point toward the rear of saddle portion (36).

Since the frame rails (31, 32) converge forward of saddle portion (36), the first portion (51A,52A) of cross supports (51,52) extending from the front end (34) lie laterally inward of first and second frame rails (31,32) at saddle portion. Struts (53, 54) may connect the frame rails (31, 32) to first portion of cross supports (51A,52A) at saddle portion with a first strut (53) extending upward and laterally outward at an angle from each cross support (51,52) to attach to a corresponding frame rail (31,32). First struts (53) connect to the parallel first portion (51A,52A) of cross supports (51,52) to the saddle portion of the frame rails (51,52) adjacent to the cavity (55) defined between the frame rails (31,32) and cross supports (51,52) at saddle portion (36) of chassis (30). A second strut (54) may connect a second portion (51B,52B) of cross supports (51,52) located where each cross support flares out below a frame rail such that strut (54) extends vertically between a cross support and a corresponding frame rail. Second strut (54) is also located adjacent to the cavity (55).

The slidable drawer (35) is positioned within cavity (55) defined between first and second frame rails (31,32); cross supports (51,52) and struts (53,54) at saddle portion (36). The spread of first and second frame rails (51,52) and cross supports (53,54) rearward of saddle portion (36) to rear end (38) provides a wider opening (56) behind slidable drawer (35) facilitating rearward extension of the slidable drawer (35) as depicted in FIG. 3 to remove the battery (300). As further depicted in FIG. 3, struts (53,54) may be used to support the a pair of tracks (60) on which the slideable drawer (35) is mounted.

As shown, tracks (60) may be attached inward of struts (53,54) extending relatively parallel to each other. Telescoping rails (62) may be provided on slideable slidable drawer (35) that fit over and slide on tracks (60). As shown, slidable drawer (35) slides rearward from saddle portion (36) of chassis (30) from cavity (55) through opening (56) such that it protrudes rearward of chassis (30) in a fully extended position (FIG. 3). In this position, the battery (300) is exposed in slidable drawer (35) facilitating its removal. When the slidable drawer (35) is slid inward in the direction of the arrow shown in FIG. 4, slidable drawer (35) advances inward of opening (56) housing slidable drawer (35) and the battery (300) centrally within chassis (30) distributing the weight of battery (300) evenly between the front end (34) and rear end (38). Positioning the battery (300) between rails (31,32); cross supports (51,52) and struts (53,54) forms a cage around the battery (300) to reduce the likelihood of damage to battery (300) in any impact or rollover situation.

With reference to FIG. 5, suitable bodywork, generally indicated at (75) may be attached to the chassis (30). The shape of the bodywork (75) includes a front portion or nose (76) having wheel arches (77) to accommodate front wheel and tire assemblies. One or more opening (78) may be provided within the nose (76) to route air into chassis (30) and toward battery (300) as the ATV is in forward motion. Additional airflow routing may occur at wheel arches (77). Bodywork (75) may include a rear portion or tail (79) that integrates rear wheel arches (82). Lights generally indicated at (80) may be provided on the front and rear portions of the bodywork (75), such as headlights, fog lights, daytime running lights, signal lights, tail lights and brake lights.

A foot platform (84) may extend between the forward wheel arch (77) and rear wheel arch (82). The foot platform (84) facilitates mounting of the ATV by providing a location for the user to step up on to the ATV and swing a leg over the saddle (85) of the ATV. The saddle (85) is supported on saddle portion (36) of chassis (30) above foot platform (84). As noted above, a rider sits upon saddle (85) with legs straddling the saddle (85) and extending downward on either side of chassis (30). The foot platform (84) provides a surface below saddle (85) on which a rider may rest their feet or apply foot pressure as needed in maneuvering the ATV. Handle bar (50) is located forward of saddle (85) and has a pair of grips (86) for the rider's hands. Brake handles (87) may be provided adjacent to grips (86) for ease of operation by hand while riding the ATV. The grips (86) provide an additional point to the foot platform (84) to which the rider may apply forces while riding for purposes of maintaining personal balance, taking an active role in weighting the suspension or changing the balance of the ATV during maneuvering. Locating battery (300) within chassis (30) below saddle (85) places the weight of battery (300) beneath the rider's seat and between their legs to provide improved feel and control of the weight of the ATV.

The invention claimed is:

1. A chassis for an all-terrain vehicle (ATV), the chassis comprising a first frame rail and a second frame rail, where the first frame rail and second frame rail have a front end and a rear end separated by a saddle portion;

where the front end and rear end extend downward relative to the saddle portion;

the first frame rail and second frame rail being held in a spaced relationship relative to each other by at least one strut;

where the first frame rail and second frame rail extend inward relative to each other as they extend downward from the saddle portion toward the front end; and wherein the first frame rail and second frame rail extend laterally outward relative to each other as they extend rearward of the saddle portion defining a rearward facing opening;

a first cross support extending from the front end to the rear end of the first frame rail connecting the first frame rail below the saddle portion thereof, a second cross support extending from the front end to the rear end of the second frame rail connecting the second frame rail below the saddle portion; the first and second frame rails and first and second cross supports defining a cavity below the frame rails within the saddle portion thereof;

a slidable drawer mounted within the cavity and slidable to extend rearward of the cavity through the opening to exit the rear of the chassis;

wherein the slidable drawer holds a battery.

2. The chassis of claim 1, wherein the cross supports extend generally parallel to each other from the front end and beneath the saddle portion and extend laterally outward relative to each other from the saddle portion to the rear end of the chassis.

3. The chassis of claim 1, wherein the first cross support and second cross support extend rearward from the front end and are located laterally inward of the first frame rail and the second rail below at least a portion of the saddle portion formed by the first frame rail and second frame rail, and as the first cross support and second cross support extend rearward from the saddle portion, they extend laterally outward relative to each other passing under the first frame rail and second frame rail respectively; wherein a first strut extends upward and laterally outward from each of the first cross support and second cross support to connect to the first frame rail and second frame rail at the saddle portion; and a second strut extends upward vertically from each of the first cross support and second cross support where the first frame rail and second frame rail cross over the first cross support and second cross support.

4. The chassis of claim 1, further comprising at least one strut extending downward from the first frame rail to the first cross support and at least one strut extending downward from the second frame rail to the second cross support, wherein the at least one strut is adjacent to the cavity; a track assembly supported on the at least on struts on inward of the first frame rail and second frame rail, wherein the slidable drawer is slidably mounted on the track assembly.

5. The chassis of claim 1, further comprising bodywork attached to the chassis, the bodywork including a saddle mounted on the saddle portion; and at least one foot platform located below the saddle and laterally outward thereof.

6. The chassis of claim 1, further comprising an electric motor supported on at least one of the frame rails; the electric motor being electrically connected to the battery; and the electric motor coupled to a wheel and tire assembly to cause rotation of the wheel and tire assembly.

7. The chassis of claim 1, further comprising a suspension subframe supported on the front end of the first and second frame rails; the suspension subframe supporting a front wheel and tire assembly; a handle bar coupled to the front wheel and tire assembly to provide steering input there to; a rear wheel and tire assembly rotatably supported on the rear end of the first and second frame rails; and a drive system supported on at least one of the first and second frame rails; the drive system including an electric motor, a control module and a throttle device, wherein the electric motor is rotationally connected to at least one of the wheel and tire assemblies; the electric motor is electrically connected to and configured to receive at least a first signal from the control module, the control module is electrically connected to and configured to receive a charge from the battery; and the throttle device is electrically connected to and configured to send a second signal to the control module.

8. The chassis of claim 7, wherein the front and rear wheel and tire assemblies include four wheels and the electric motor is connected to all four wheels.

9. The chassis of claim 1, further comprising at least one light supported on at least one of the first and second frame rails, wherein the at least one light is electrically connected to the battery.

10. The chassis of claim 1, further comprising at least one device, a step down converter, a secondary battery and a transducer;

wherein the step down converter is electrically connected to, and configured to receive a charge from the secondary battery at a first voltage level; the at least one device is electrically connected to, and configured to receive a signal from the step down converter at a second voltage level which is less than the first voltage level; and the transducer is electrically connected to the battery and the secondary battery to provide a recharging voltage to the secondary battery from the battery.

11. The chassis of claim 10, wherein the device includes at least one of a light, a horn, and a winch.

12. An all-terrain vehicle (ATV) comprising:

a chassis, the chassis including a first frame rail and a second frame rail, the first frame rail and second frame rail having a front end, a saddle portion and a rear end, where the first frame rail and second frame rail are held in a laterally spaced relationship by at least one cross strut; the first frame rail and second frame rail extending downward from the saddle portion at the front end and rear end; a first cross support extending from the front end to the rear end of the first frame rail below the saddle portion; and a second cross support extending from the front end to the rear end of the second frame rail below the saddle portion; wherein the first and second frame rails and the first and second cross supports define a central cavity beneath the saddle portion and an opening rearward of the saddle portion between the first and second frame rails at the rear end; a slidable drawer slideably mounted within the cavity between a first position within the cavity and a second position extending outward of the rear end of the first and second frame rails; a battery housed within the slidable drawer and removable therefrom;

a first wheel and tire assembly supported on the front end of the chassis and a second wheel and tire assembly supported on the rear end of the chassis;

a handle bar coupled to the first wheel and tire assembly to provide steering input thereto; and a saddle supported on the saddle portion of the chassis rearward of the handle bar.

13. The all-terrain vehicle (ATV) of claim 12, further comprising a secondary battery supported within the slidable drawer and connected to a controller, wherein the controller includes a transducer electrically connected to the battery to provide a recharging voltage from the secondary battery to the battery.

14. The all-terrain vehicle (ATV) of claim 12, further comprising a bodywork supported on the chassis, the bodywork including a nose having an opening therein configured to route air toward the battery.

15. The all-terrain vehicle (ATV) of claim 12, further comprising a bodywork supported on the chassis, wherein the bodywork includes at least one foot platform supported below the saddle and laterally outward thereof.

* * * * *